United States Patent
Detert

(10) Patent No.: US 9,451,331 B2
(45) Date of Patent: *Sep. 20, 2016

(54) PROXY DEVICE OPERATION IN COMMAND AND CONTROL NETWORK

(75) Inventor: Joerg Detert, Hannover (DE)

(73) Assignee: Lattice Semiconductor Corporation, Portland, OR (US)

(*) Notice: Subject to any disclaimer, the term of this patent is extended or adjusted under 35 U.S.C. 154(b) by 118 days.

This patent is subject to a terminal disclaimer.

(21) Appl. No.: 13/348,378

(22) Filed: Jan. 11, 2012

(65) Prior Publication Data

US 2012/0185580 A1 Jul. 19, 2012

Related U.S. Application Data

(60) Provisional application No. 61/433,217, filed on Jan. 15, 2011.

(51) Int. Cl.
*G06F 15/16* (2006.01)
*G06F 15/177* (2006.01)
(Continued)

(52) U.S. Cl.
CPC .... *H04N 21/6106* (2013.01); *H04L 29/06027* (2013.01); *H04L 29/06068* (2013.01); *H04L 29/08846* (2013.01); *H04L 67/125* (2013.01); *H04N 21/4363* (2013.01); *H04N 21/43635* (2013.01); *H04N 21/44227* (2013.01);
(Continued)

(58) Field of Classification Search
CPC . H04L 29/06; H04L 45/00; H04L 29/06027; H04L 12/66; H04L 47/10

USPC ............... 709/217–219, 223, 230, 249, 250; 370/401, 395.5, 395.3, 395.31; 725/25, 725/37, 110, 88, 117

See application file for complete search history.

(56) References Cited

U.S. PATENT DOCUMENTS 8,572,224 B2 * 10/2013 Hite et al. ..................... 709/223
2002/0031120 A1 * 3/2002 Rakib ........................... 370/386
(Continued)

FOREIGN PATENT DOCUMENTS

CN 101218574 A 7/2008
EP 1063829 A2 12/2000
(Continued)

OTHER PUBLICATIONS

Callaly, F & Corcoran P, "A UPnP Compliant PVR Appliance with Longtail Internet Functionality" 07803-9459-3/06 @2006 IEEEE.*
(Continued)

*Primary Examiner* — Aftab N. Khan
(74) *Attorney, Agent, or Firm* — Fenwick & West LLP

(57) ABSTRACT

Embodiments of the invention are generally directed to proxy device operation in a command and control network. An embodiment of a method includes discovering one or more devices in a first network at a proxy device, generating by the proxy device virtual devices representing the one or more devices, and advertising by the proxy device the one or more virtual devices on a second network. The method includes receiving by the proxy device a command for a first virtual device of the one or more virtual devices from a command device, the command device being outside the first network, the command being received via the second network, and the first virtual device representing a target device located in the first network. The method further includes forwarding the command to the target device via the first network.

12 Claims, 11 Drawing Sheets

(51) Int. Cl.

| | | |
|---|---|---|
| *H04N 21/61* | (2011.01) | |
| *H04L 29/06* | (2006.01) | |
| *H04W 8/00* | (2009.01) | |
| *H04N 21/4363* | (2011.01) | |
| *H04N 21/442* | (2011.01) | |
| *H04L 29/08* | (2006.01) | |

(52) U.S. Cl.
CPC ......... *H04N21/6125* (2013.01); *H04W 8/005* (2013.01); *H04L 67/16* (2013.01)

(56) References Cited

U.S. PATENT DOCUMENTS

| | | | |
|---|---|---|---|
| 2004/0133704 A1 | 7/2004 | Krzyzanowski et al. | |
| 2005/0063416 A1* | 3/2005 | Shin et al. | 370/465 |
| 2006/0133392 A1* | 6/2006 | Ajitomi et al. | 370/401 |
| 2007/0124447 A1 | 5/2007 | Ajitomi et al. | |
| 2008/0231762 A1 | 9/2008 | Hardacker et al. | |
| 2009/0100495 A1* | 4/2009 | Manapragada et al. | 725/138 |
| 2009/0132737 A1 | 5/2009 | Huang et al. | |
| 2009/0288130 A1* | 11/2009 | Ohkita | 725/127 |
| 2010/0125678 A1 | 5/2010 | Chen et al. | |
| 2010/0185764 A1 | 7/2010 | Kondo et al. | |
| 2010/0250725 A1* | 9/2010 | Meenan et al. | 709/223 |
| 2010/0312851 A1 | 12/2010 | Jackson et al. | |
| 2010/0329223 A1 | 12/2010 | Matsumura | |
| 2011/0167465 A1* | 7/2011 | Higuchi et al. | 725/117 |
| 2011/0246675 A1 | 10/2011 | Fukami | |
| 2011/0261834 A1* | 10/2011 | Krzyzanowski et al. | 370/466 |
| 2012/0011535 A1* | 1/2012 | Eguchi et al. | 725/25 |
| 2012/0042346 A1* | 2/2012 | Yoshida et al. | 725/81 |
| 2012/0090001 A1* | 4/2012 | Yen | 725/37 |
| 2012/0110114 A1* | 5/2012 | Meenan et al. | 709/216 |
| 2013/0142181 A1* | 6/2013 | Makim et al. | 370/338 |
| 2014/0143815 A1 | 5/2014 | Eguchi et al. | |

FOREIGN PATENT DOCUMENTS

| | | |
|---|---|---|
| EP | 2026504 A1 | 2/2009 |
| EP | 2169919 A1 | 3/2010 |
| EP | 2410737 A1 | 1/2012 |
| JP | 2001-186166 A | 7/2001 |
| JP | 2005-321926 A | 11/2005 |
| TW | 201020784 A | 11/1997 |
| TW | 200923655 A | 6/2009 |
| WO | WO 2010/064292 A1 | 6/2010 |
| WO | WO 2010/064563 A1 | 6/2010 |
| WO | WO 2010/106705 A1 | 9/2010 |
| WO | WO 2010/111426 A1 | 9/2010 |
| WO | WO 2010/141714 A2 | 12/2010 |

OTHER PUBLICATIONS

Hitachi, Ltd., Panasonic Corp., Philips Consumer Electronics International B.V., Silicon Image, Inc., Sony Corp., Thomson Inc., and Toshiba Corp., "High-Definition Multimedia Interface Specification Version 1.4," Jun. 5, 2009, 425 pages.

International Search Report and Written Opinion of the International Searching Authority mailed Aug. 31, 2012, in International Patent Application No. PCT/US2012/021236, 9 pages.

European Extended Search Report, European Application No. 12734710.2, May 14, 2014, 9 pages.

Chinese First Office Action, Chinese Application No. 201280013287.0, May 5, 2015, 15 pages.

Japanese Office Action, Japanese Application No. 2013-549567, Apr. 21, 2015, 4 pages.

Korean Office Action, Korean Application No. 10-2013-7021470, Jun. 29, 2015, 9 pages.

Taiwan Office Action, Taiwan Application No. 101101440, Sep. 25, 2015, 8 pages.

\* cited by examiner

| Byte | 3 | 2 | 1 | 0 |
|---|---|---|---|---|
| Device ID | Virtual Device ID | | Physical Device ID | |
| | Physical Device ID (continued) | | | |

Device ID
200

FIG. 2

| Bit | Capability | Description |
|---|---|---|
| 0 | RAP Source - General | Ability to transmit graphics and audio and receive events over a Remote Applications connection. |
| 1 | RAP Source - Sound | Ability to transmit audio (short UI clips) and receive events only over Remote Applications connection. |
| 2 | RAP Source - Control | Ability to receive events only over Remote Applications connection. Control commands are expressed as key code events. |
| 3 | RAP Source - netView | Ability to receive content over a Remote Applications connection that has same capabilities as General type but constrained to one of the defined combined protocol dimensions. Content of this stream type is HDCP2.0 encrypted. |
| 4 | RAP Sink - General | Ability to receive graphics and audio and transmit events over a Remote Applications connection. |
| 5 | RAP Sink - Sound | Ability to receive audio (short UI clips) and transmit events only over Remote Applications connection. |
| 6 | RAP Sink - Control | Ability to transmit events only over Remote Applications connection. Control commands are expressed as key code events. |
| 7 | RAP Sink - netView | Ability to receive content over a Remote Applications connection that has same capabilities as General type but constrained to one of the defined combined protocol dimensions. Content of this stream type is HDCP2.0 encrypted. |
| 8 | netCLIC Proxy | Ability of a device to provide the proxy service. |
| 9..15 | RFU | Reserved for future use, value = 0. |

Device Capability Bit-Vector Interpretation
300

FIG. 3

| Opcode | value | Description | Parameters | Parameter Description | Response | Directly addressed | Broadcast | Mandatory for Initiator | Mandatory for Follower |
|---|---|---|---|---|---|---|---|---|---|
| <Vendor Command With ID> | 0xA0 | Allows vendor specific command to be sent | [Vendor ID] [protocol Opcode] [Device ID] [Capabilities] | | | | X | X | X |

Format for CEO Vendor Specific <Report ID> Message
400

FIG. 4

| Bit Order | 31 30 29 28 27 26 25 24 23 22 21 20 19 18 17 16 | 15 14 13 12 11 10 9 8 | 7 6 5 4 3 2 1 0 |
|---|---|---|---|
| IP Header | Version=0x4 Hdr-Len=0x5 | RFU | Total Length |
| | Identification | Flags | Fragment Offset |
| | Time-To-Live = 0x01 | Protocol = 0x11 | Header Checksum |
| | Source Address | | |
| | Destination Address = 255.255.255.255 | | |
| UDP Header | Source Port | Destination Port = 38202 | |
| | UDP Length | UDP Checksum | |
| IP Disc Header | Protocol = 0x3F | Version | RFU | Opcode |
| Device Entry1 | Type = 0x01 | Length = 0x03 | Capabilities |
| | DeviceIP | | |
| | DeviceID | | |
| Port Entry | Type = 0x02 | Length = 0x00 | Control Port |
| Device Entry1 | Type = 0x01 | Length = 0x03 | Capabilities |
| | DeviceIP | | |
| | DeviceID (Upper) | | |
| | DeviceID (Lower) | | |
| Port Entry | Type = 0x02 | Length = 0x00 | Control Port |
| ... | ... | ... | ... |

Discovery Announcement Packet Format
500

FIG. 5

(0=optional, x=required, blank=non-supported)

| COMMAND | COMMAND PROTOCOL KEY CODE | CE0 USER CODE | COMMAND PROTOCOL | CE0 |
|---|---|---|---|---|
| Select (OK) | 0xCE000000 | 0x0000 | x | x |
| Up | 0xCE000001 | 0x0001 | x | x |
| Down | 0xCE000002 | 0x0002 | x | x |
| Left | 0xCE000003 | 0x0003 | x | x |
| Right | 0xCE000004 | 0x0004 | x | x |
| Right-Up | 0xCE000005 | 0x0005 | o | x |
| Right-Down | 0xCE000006 | 0x0006 | o | x |
| Left-Up | 0xCE000007 | 0x0007 | o | x |
| Left-Down | 0xCE000008 | 0x0008 | o | x |
| Menu | 0xCE000009 | 0x0009 | x | x |
| Setup Menu | 0xCE00000A | 0x000A | o | x |
| Contents Menu | 0xCE00000B | 0x000B | o | x |
| Favorite Menu | 0xCE00000C | 0x000C | o | x |
| Exit | 0xCE00000d | 0x000d | x | x |
| Media Top Menu | 0xCE000010 | 0x0010 | o | x |
| Media Context-sensitive menu | 0xCE000011 | 0x0011 | o | x |
| Number Entry Mode | 0xCE00001D | 0x001D | o | x |
| Number 11 | 0xCE00001E | 0x001E | x | x |
| Number 12 | 0xCE00001F | 0x001F | x | x |
| Number keys 0 - 9 | 0xCE000020 - 0xCE000029 | 0x0020-0x0029 | x | x |
| '.' or '-' for US channel numbers | 0xCE00002a | 0x002a | x | x |
| Enter | 0xCE00002B | 0x002B | o | x |
| Clear (Exit-OCAP) | 0xCE00002C | 0x002C | o | x |
| Next Favorite | 0xCE00002F | 0x002F | o | x |
| Channel up | 0xCE000030 | 0x0030 | x | x |
| Channel down | 0xCE000031 | 0x0031 | x | x |
| Previous channel | 0xCE000032 | 0x0032 | x | x |
| Audio (used to select alternate audio track) | 0xCE000033 | 0x0033 | x | x |
| Source | 0xCE000034 | 0x0034 | x | x |
| Info | 0xCE000035 | 0x0035 | x | x |
| Help (CE0) | 0xCE000036 | 0x0036 | o | x |

FIG. 6

| | | | | |
|---|---|---|---|---|
| Page Up | 0xCE000037 | 0x0037 | x | x |
| Page Down | 0xCE000038 | 0x0038 | x | x |
| Power | 0xCE000040 | 0x0040 | o | x |
| Volume Up | 0xCE000041 | 0x0041 | x | x |
| Volume Down | 0xCE000042 | 0x0042 | x | x |
| Mute | 0xCE000043 | 0x0043 | x | x |
| Play | 0xCE000044 | 0x0044 | x | x |
| Stop | 0xCE000045 | 0x0045 | x | x |
| Pause | 0xCE000046 | 0x0046 | x | x |
| Record | 0xCE000047 | 0x0047 | x | x |
| Fast reverse | 0xCE000048 | 0x0048 | x | x |
| Fast forward | 0xCE000049 | 0x0049 | x | x |
| Eject | 0xCE00004A | 0x004A | x | x |
| Skip forward | 0xCE00004b | 0x004b | x | x |
| Skip reverse | 0xCE00004c | 0x004c | x | x |
| Stop-Record | 0xCE00004D | 0x004D | o | x |
| Pause-Record | 0xCE00004E | 0x004E | o | x |
| Video (used to select alternate video track/angle) | 0xCE000050 | 0x0050 | x | x |
| Sub picture | 0xCE000051 | 0x0051 | o | x |
| Video on Demand | 0xCE000052 | 0x0052 | x | x |
| Guide (EPG) | 0xCE000053 | 0x0053 | x | x |
| Timer Programming | 0xCE000054 | 0x0054 | o | x |
| Initial Configuration | 0xCE000055 | 0x0055 | o | x |
| Select Broadcast Type | 0xCE000056 | 0x0056 | o | x |
| Select Sound Presentation | 0xCE000057 | 0x0057 | o | x |
| Pay Function | 0xCE000060 | 0x0060 | o | x |
| Pause-Play Function | 0xCE000061 | 0x0061 | o | x |
| Record Function | 0xCE000062 | 0x0062 | o | x |
| Pause-Record Function | 0xCE000063 | 0x0063 | o | x |
| Stop Function | 0xCE000064 | 0x0064 | o | x |
| Mute Function | 0xCE000065 | 0x0065 | o | x |
| Restore Volume Function | 0xCE000066 | 0x0066 | o | x |
| Tune Function | 0xCE000067 | 0x0067 | o | x |
| Select Media Function | 0xCE000068 | 0x0068 | o | x |
| Select A/V Input Function | 0xCE000069 | 0x0069 | o | x |

FIG. 7

| Select Audio Input Function | 0xCE00006A | 0x006A | o | x |
| --- | --- | --- | --- | --- |
| Power Toggle Function | 0xCE00006B | 0x006B | o | x |
| Power Off Function | 0xCE00006C | 0x006C | x | x |
| Power On Function | 0xCE00006D | 0x006D | x | x |
| F1 -Blue | 0xCE000071 | 0x0071 | x | x |
| F2-Red | 0xCE000072 | 0x0072 | x | x |
| F3-Green | 0xCE000073 | 0x0073 | x | x |
| F4-Yellow | 0xCE000074 | 0x0074 | x | x |
| F5 | 0xCE000075 | 0x0075 | o | |
| Text or data (for teletext in Europe, Mheg app in UK, or data application generally) | 0xCE000076 | 0x0076 | x | x |
| PIP Off Function | 0xCE000077 | 0x0077 | x | |
| PIP On Function | 0xCE000078 | 0x0078 | x | |
| PIP Size Toggle | 0xCE000079 | 0x0079 | x | |
| PIP Move | 0xCE00007A | 0x007A | x | |
| ActivateDisplay (One Touch Play) | 0xCE000090 | 0x0090 | x | x |
| Standby | 0xCE000091 | 0x0091 | x | |

FIG. 8

| | 31 | Byte 0 | 24 | 23 | Byte 1 | 16 | 15 | Byte 2 | 08 | 07 | Byte 3 | 00 |
|---|---|---|---|---|---|---|---|---|---|---|---|---|
| Word 00 | | Opcode = 0xB1 | | | RFU | | | | | | Length=4 | |
| Word 01 | | | | | | | Protocol Key Code | | | | | |

Key Press Command Packet Format
905

| | 31 | Byte 0 | 24 | 23 | Byte 1 | 16 | 15 | Byte 2 | 08 | 07 | Byte 3 | 00 |
|---|---|---|---|---|---|---|---|---|---|---|---|---|
| Word 00 | | Opcode = 0xB2 | | | RFU | | | | | | Length=4 | |
| Word 01 | | | | | | | Protocol Key Code | | | | | |

Key Release Command Packet Format
910

| | 31 | Byte 0 | 24 | 23 | Byte 1 | 16 | 15 | Byte 2 | 08 | 07 | Byte 3 | 00 |
|---|---|---|---|---|---|---|---|---|---|---|---|---|
| Word 00 | | Opcode = 0x81 | | | status | | | | | | Length= 0 | |

Goodbye Command Packet Format
915

PROXY DEVICE OPERATION IN COMMAND AND CONTROL NETWORK

RELATED APPLICATION

This application is related to and claims priority to U.S. Provisional Patent Application No. 61/433,217, filed Jan. 15, 2011, and such application is incorporated herein by reference.

BACKGROUND

Homes and other personal spaces may include numerous electronic devices, including entertainment devices, such as televisions, video players, audio sound systems, gaming systems, personal computers, and mobile devices. Such devices are increasingly connected or networked together to allow for the transfer of data, such as multimedia data for display, between such devices.

Networks of devices may include HDMI™ (High Definition Multimedia Interface 1.4 Specification, issued May 28, 2009) data protocol and MHL™ (Mobile High-Definition Link) data protocol. MHL is an interface protocol that provides for connection of a mobile device to an HDMI display device. Such protocols allow for the transfer of high definition multimedia data between certain devices.

However, an environment may include multiple networks, depending on the relationship between devices and the capabilities of such devices. In such environment, certain devices may be incapable of communicating with each other, even though such devices are in close proximity to each other.

BRIEF DESCRIPTION OF THE DRAWINGS

Embodiments of the invention are illustrated by way of example, and not by way of limitation, in the figures of the accompanying drawings in which like reference numerals refer to similar elements.

FIG. 2 illustrates a device identification in an embodiment of an apparatus or system;

FIG. 3 is an illustration of a device capability bit-vector in an embodiment of an apparatus or system;

FIG. 4 illustrates a vendor specific message utilized in an embodiment of an apparatus or system;

FIG. 5 is an illustration of a discover announcement packet for an embodiment of an apparatus or system;

FIGS. 6, 7, and 8 illustrate codes used in an embodiment of an apparatus or system;

FIG. 9 is an illustration of certain command packets utilized in an embodiment of a combined control protocol;

SUMMARY

Figure 1:
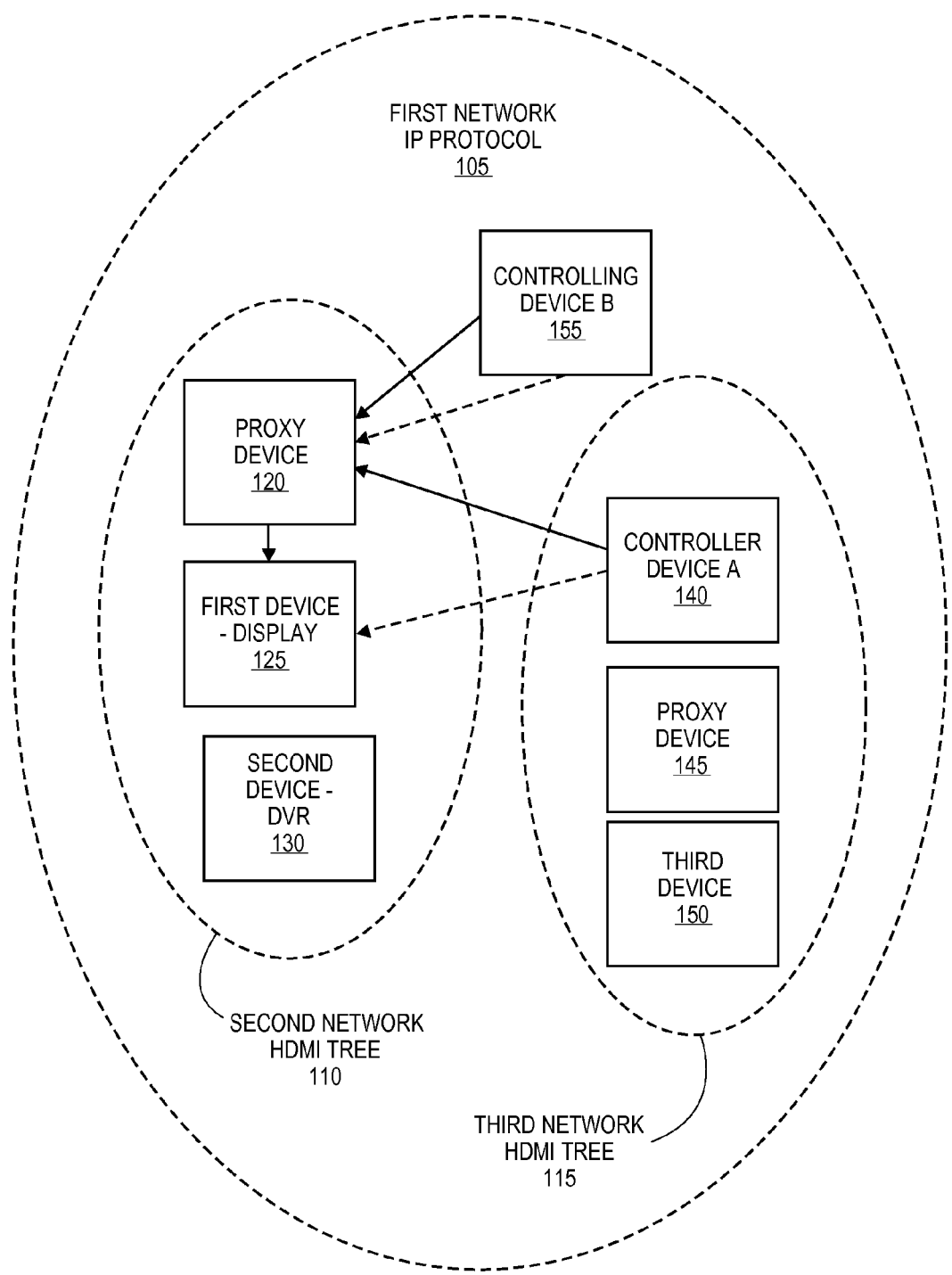
FIG. 1 is an illustration of an embodiment of a network allowing for proxy operation of devices.

Embodiments of the invention are generally directed to proxy device operation in a command and control network.

In a first aspect of the invention, an embodiment of a method includes discovering one or more devices in a first network at a proxy device, generating by the proxy device virtual devices representing the one or more devices, and advertising by the proxy device the one or more virtual devices on a second network. The method includes receiving by the proxy device a command for a first virtual device of the one or more virtual devices from a command device, the command device being outside the first network, the command being received via the second network, and the first virtual device representing a target device located in the first network. The method further includes forwarding the command to the target device via the first network.

DETAILED DESCRIPTION

Embodiments of the invention are generally directed to proxy device operation in a command and control network.

Many modern homes have numerous consumer electronics devices including multiple televisions or other displays, in several rooms. In such a home or other environments there may be a first network such as, for example, a separate HDMI tree for each television. In some embodiments, the first network is an IP (Internet protocol) based network. For example, the first network may be a Layer 2 technology (indicating Layer 2 of the OSI, Open Systems Interconnection, model), including, but not limited to, Ethernet (IEEE 802.3), wireless local area network (WLAN) (IEEE 802.11) and HDMI-HEC (HDMI-1.4 Ethernet Channel). However, embodiments are not limited to any particular protocol.

In addition, there is often a wireless second network that covers the entire home or environment, where there are often computers or smart phones attached to the second network. The second network may include an IP-based network, and specifically a Layer 3 based Internet Protocol network. The second network may include UPnP (Universal Plug and Play) protocol capability for device discovery. However, embodiments are not limited to any particular protocol. Certain devices, such as audio-video devices, may be on both the first network (such as HDMI or MHL) network and the second network.

In some embodiments, the first network includes a device control protocol. A device control protocol may include, but is not limited to, CEC (Consumer Electronics Control) or RCP (Remote Control Protocol). CEC is a device control protocol that provides control and device discovery between consumer electronics devices over an HDMI network. HDMI devices are grouped into connected tree structured clusters. The main purpose of the HDMI network is to provide for transporting A/V (audio-video) streams between devices in the same HDMI tree. An HDMI tree commonly has a single display device and is in a single room. CEC addresses are only unique within a single tree, and only a small number (12) of unique CEC logical addresses are defined. RCP is a device control protocol of MHL that enables a user to operate multiple devices with one remote control. However, embodiments are not limited to CEC, RCP, or other particular device control protocol.

Most HDMI devices have IR (infrared) remote controls or controls on the device itself. Watching an AV stream normally requires controlling at least two devices—the display and the media source. Mixing devices from multiple vendors often lead to a confusing number of controls. IR remote controls normally only work within the same room as the device being controlled.

In some embodiments, an apparatus, system, or method allows a device on a wireless network (such as an IP-based, UPnP compatible network) to send selected commands (such as CEC or RCP commands) to an AV device connected to the wireless network. In some embodiments, the operation may be utilized when a user has a device, such as a smart phone or other similar device, connected to a wireless network but not directly to an HDMI or MHL network. In some embodiments, an apparatus, system, or method allows a device in one HDMI or MHL tree to send a CEC or RCP command to a device in a different HDMI or MHL tree over a wireless network connected to both HDMI or MHL networks. In some embodiments, a device connected to both an HDMI or MHL network and wireless network may act as a proxy gateway, forwarding CEC or RCP commands received over the IP network to another device attached only to the HDMI or MHL network. In some embodiments, an apparatus, system, or method allows a device to send commands equivalent to CEC or RCP commands to an HDMI or MHL device over a network other than HDMI or MHL, or from outside the devices' HDMI or MHL tree, utilizing a proxy device.

In some embodiments, a combined control protocol provides device control and discovery among devices connected over a wireless network, such as an IP or UPnP compatible network, allowing for control of devices from outside of HDMI or MHL trees utilizing proxy devices. In some embodiments, a controlling device outside an HDMI or MHL tree may communicate with a proxy device capable of communicating via the wireless network protocol (a first network protocol) and HDMI or MHL protocol (a second network protocol) for the purpose of controlling a device within the HDMI or MHL tree that is not capable of communicating via the wireless protocol.

In a conventional system, CEC/HDMI only operates within a single HDMI tree and RCP/MHL only operates within a single MHL tree, thus preventing devices that are not in a particular HDMI or MHL tree from sending CEC or RCP messages to devices that are within the HDMI or MHL tree. Further, devices that are in separate HDMI or MHL trees are prevented from communicating with each other with CEC or RCP.

In some embodiments, a proxy device (which may be referred to as a legacy device proxy), such as a CEC or RCP proxy, is provided in a combined control protocol that allows a control protocol aware proxy device to represent and advertise a device-control-protocol-only device (where such device may also be referred to as a legacy device, and may include, for example, a CEC-only or RCP-only device that is not reachable vie IP-based channels) to other protocol devices over a wireless second network as if the communication-protocol-only device was second protocol aware. In some embodiments, a proxy device may accept commands and messages directed to the device it represents, forwarding commands from a requester to the actual device and forwarding responses from the device to the requester. In some embodiments, an enumeration process for the combined control protocol assigns globally unique identifiers to the protocol capable devices and advertises those identities to all protocol capable devices on the network.

In some embodiments, an apparatus, system, or process allows a legacy device to benefit from certain features provided by a combined control protocol. These extra features may include: Globally unique addressing, device discovery, and device control over an IP network. An IP network may include more devices than an HDMI network, and commonly covers an entire building or household, thus providing greater flexibility and control for devices.

In some embodiments, a proxy device, such as a CEC or RCP proxy, allows a combined control protocol aware device, such as a smart phone, to control any device control protocol (such as CEC or RCP) compatible device that is reachable through the combination of the wireless second network and HDMI or MHL networks, without requiring that all devices be protocol capable. In some embodiments, in order to provide such control of devices, only one device per HDMI or MHL tree needs to be combined control protocol aware, such device acting as a proxy device for other devices in the HDMI or MHL tree. In an example, a relatively inexpensive consumer device, such as a Blue Ray player, that is compatible with the combined control protocol may act as the proxy device, thus increasing the value of the entire HDMI tree.

In some embodiments, a proxy device, such as a CEC or RCP proxy, enables a combined control protocol device within a first HDMI or MHL tree to control another device that is within a different HDMI or MHL tree or that is not within any HDMI MHL tree. For example, a combined control protocol aware smart phone that is not connected by HDMI may be used to control a DVD (Digital Video Disc or Digital Versatile Disc) player or a television. In another example, a combined control protocol aware television may be used to arrange a recording between a set top box and a DVR (digital video recorder) in a different HDMI tree from the controlling television.

In some embodiments, a proxy device further enables device control protocol capable devices to determine in which HDMI or MHL tree proxied devices reside. Because an actual A/V (audio/video) data stream travels only over HDMI or MHL, and thus may only be transferred between devices in the same HDMI or MHL tree, it is useful for a controlling device to be capable of determining the relative locations of the devices being controlled. In an example, it would not be useful to attempt to instruct a DVD player in one HDMI or MHL tree to play a disc, and to instruct a display device in another HDMI or MHL tree to display the resulting data stream because the data stream would not be transferable between the devices.

In some embodiments, a proxy device is a device that supports both a device control protocol, such as CEC or RCP, and the combined control protocol, and can act as proxy for legacy devices that are not combined control protocol aware. In some embodiments, the proxy device determines a list of available non-combined control protocol aware devices in its HDMI or MHL tree via discovery of such devices in HDMI or MHL operation, creates a globally unique virtual identifier for each of the devices, advertises the devices over a discovery mechanism of the combined control protocol, and responds to protocol command stream connection requests to those identifiers. In some embodiments, a proxy device represents other devices in the HDMI or MHL tree using virtual identifications of such other devices. In some embodiments, the proxy device forwards commands directed to a particular virtual ID to the device the virtual ID represents. In some embodiments, the proxy device responds to discovery or metadata queries about the virtual device with information the proxy has about the device, where such information may include user data stored locally on the proxy device, such as a human/user friendly device name. In such operation, a virtual device is a non-combined control protocol aware device that is being represented by a proxy device.

FIG. 1 is an illustration of an embodiment of a network allowing for proxy operation of devices. In this illustration, a first network in a home or other environment is an IP protocol network 105. Within such network are one or more additional networks, such networks being HDMI (or MHL) trees or similar structures, such as a second network (HDMI tree 110) and a third network (HDMI tree 115). In this illustration, HDMI tree 110 includes devices such as proxy device 120 (which may be any type of consumer electronic device) that is combined protocol aware, and one or more non-combined protocol aware devices, such as first device 125 (for example, a television display) and second device 130 (for example, a DVR device). HDMI tree 115 may further include devices such as combined control protocol capable proxy device 145 and one or more non-combined protocol aware devices, such as third device 150. In addition, there may be one or more devices that are used to control devices within HDMI trees, such devices including controlling device A 140 within HDMI tree 115 and controlling device B 155 that is outside any HDMI tree (where such controlling device may any device capable of providing commands, including, for example, a smart phone that is connected to the IP network 105).

In some embodiments, a device, such as controlling device A 140 or controlling device B 155, operates to control a device in an HDMI tree, where the controlling device is not located within the HDMI tree and wherein the controlled device is not combined control protocol capable and cannot receive the commands via IP protocol. In some embodiments, the controlling device utilizes a proxy device to transfer communications to and from the controlled device.

In one example, a user may wish to utilize controlling device A 140 to control the television display 125. In some embodiments, the controlling device 140 utilizes the combined control protocol to transmit signals to proxy device 120, which is the same HDMI tree as television display 125. In some embodiments, the proxy device 120 discovers and generates virtual devices for communications with non-combined control protocol devices within the HDMI tree, such as television display 125 and DVR 130. In some embodiments, the proxy device provides commands to a virtual device representing television display 125, resulting in the commands being received by proxy device 120 via IP protocol and being transferred to the television display via HDMI protocol, with responses being transmitted via proxy device 120 in the reverse direction.

In some embodiments, a combined command protocol provides device identifications for devices in an IP network (or other wireless network). FIG. 2 illustrates a device identification in an embodiment of an apparatus or system. In this illustration, a unique combined control protocol ID 200 is provided for each device in the network to provide for unique addressing of each device. In some embodiments, an identifier may be a 64-bit number containing the device's globally unique 48-bit Ethernet MAC (Media Access Control) address, with the other 16 bits set to 0. However, embodiments are not limited to this address format.

FIG. 3 is an illustration of a device capability bit-vector in an embodiment of an apparatus or system. In some embodiments, vectors are generated for devices to identify capabilities, where such capabilities may include a capability of operating as a proxy device. In some embodiments, a vector is used to identify a potential proxy device and provide communications to such proxy device for forwarding to proxied devices within the same HDMI tree. In some embodiments, the capability vector 300 is a bit map defining capabilities supported by a combined control protocol device. In some embodiments, the capabilities may include a bit (bit 8 in this example) that indicates ability of the device to provide proxy service. In some embodiments, a combined control protocol device may understand a device control protocol, such as CEC protocol, and the combined control protocol but not be capable of acting as a device control protocol proxy.

In some embodiments, when a proxy device such as a CEC or RCP proxy detects a change in the surrounding HDMI or MHL network, either at boot up time or when an HDMI or MHL device is plugged or unplugged, the proxy device begins the configuration process. In some embodiments, the proxy device uses the standard CEC or RCP protocol to determine physical and logical addresses of each CEC or RCP device on the attached HDMI or MHL tree. In some embodiments, such process, the proxy device sends a CEC or RCP protocol vendor specific message to each CEC device. In some embodiments, the CEC protocol vendor message is an optional CEC message allowed by the CEC specification, the message containing the CEC Proxy device's combined control protocol ID and capabilities. At the same time, each combined control device may also be sending a similar vendor specific CEC message.

FIG. 4 illustrates a vendor specific message utilized in an embodiment of an apparatus or system. As illustrated, such message 400 requests devices to report the combined control protocol identification. In some embodiments, combined control protocol devices will respond to such message, and provide their identification. In some embodiments, a response will include a capability vector, such as the vector illustrated in FIG. 3.

Any CEC devices that do not understand the combined control protocol are required by the CEC standard to ignore the vendor specific message, where devices will acknowledge the receipt of the message but will silently ignore a message that it doesn't understand. In some embodiments, device control protocol capable devices, such as CEC or RCP capable devices, that are capable of acting as proxy will send a similar message. In some embodiments, after a short time (such as one second) to allow all messages to be received, a proxy device, such as the proxy device with the lowest CEC or RCP physical address if there are multiple devices, becomes the official proxy, and any other proxy devices act as standard combined command protocol or CEC or RCP devices. In some embodiments, the selected proxy device by this time has generated a list of all devices that do not understand the combined control protocol.

In some embodiments, the proxy device creates a set of virtual device IDs based on each device's MAC address but with the upper 16 bits (Virtual Device ID field in FIG. 1) set uniquely. In some embodiments, the proxy device creates a combined protocol device capability vector for each device control protocol only device based on its logical address, which describes the type of device. For example, the CEC logical address describes device categories television, tuner, recording device, audio device, and playback device. In some embodiments, such categories can be mapped to the combined control protocol capabilities.

In some embodiments, a device type derived from the logical address of the device control protocol only device may also be communicated to other combined protocol devices through a combined control Metadata sub-protocol, where such sub-protocol provides a set of variables that can be read and written remotely. In some embodiments, such variables may include such things as Icon and a human friendly device name.

In some embodiments, given the virtual combined control protocol device ID and capability vector, the proxy devices advertises itself and all virtual devices through a combined control protocol discovery mechanism, which may, for example, consists of a periodic local UDP (User Datagram Protocol) broadcast containing a list of combined control protocol device Ids, device capabilities, IP Addresses, and TCP (Transmission Control Protocol) port for creating control connections.

FIG. 5 is an illustration of a discovery announcement packet for an embodiment of an apparatus or system. In this illustration, a simplified picture is provided of a discovery announcement packet 500. In some embodiments, device entries repeat for each real or virtual device. In some embodiments, other fields, such as encryption headers, may be included, but such other fields are not shown here.

In some embodiments, when a combined control protocol device wants to send a device control protocol command, such as a CEC or RCP command, to one of the virtual CEC or RCP devices, the protocol device opens a TCP connection to the IP Address and port from the discovery packet. In some embodiments, a CEC proxy accepts the connection (if resources are available), reads an RUI (remote user interface) command packet from the stream, verifies the validity and contents of the RUI command packet, extracts the command, converts it to a CEC packet, and sends it to the intended CEC device through CEC/HDMI. In some embodiments, the CEC device will ACK (acknowledge) the message if received. The ACK message will be dropped as there is no response defined over the combined control protocol from the CEC message.

In some embodiments, an apparatus, system, or method includes transporting commands corresponding to selected device control protocol commands, such as CEC commands, over TCP, UDP, or other transport layer protocol. The recipient of the message is a proxy device that is connected to the IP network and possibly to the CEC or RCP compatible network. The recipient proxy device processes the message, acts on it, and may respond to it. In some embodiments, the proxy device forwards the message through the CEC or RCP network to the final recipient. In some embodiments, the proxy device may forward a response from the final recipient back to the originator.

In an example, CEC messages use CEC logical addresses to route messages. CEC distributes logical and physical addresses through its discovery procedure defined in the HDMI 1.4 specification. A CEC logical address contains information about device capabilities—there are a few dedicated addresses for a TV, tuners, recording devices, playback devices, and audio devices.

Sending CEC messages over IP generally requires using IP addressing to route messages to a CEC device that has an IP address. In some embodiments, to explicitly send a CEC message to an HDMI device without an IP address utilizes a discovery mechanism to discover the CEC address of the target device.

In some embodiments, a combined protocol device advertises itself through a combined protocol discovery mechanism, which consists of a periodic local UDP broadcast containing a list of combined control protocol device IDs, device capabilities, IP addresses, and TCP ports for creating control connections. In some embodiments, combined control protocol devices listen for the periodic discovery broadcasts and create a list of all combined control protocol devices in the network, their capabilities, and the IP and TCP addresses to be used to contact them.

In some embodiments, when a first combined control protocol device wants to send a command, such as a CEC or RCP command, to a combined control protocol target device over an second network (such as an IP or UPnP compatible network), the first device opens a connection to, for example, the IP and TCP address and port associated with the target device, and then sends combined control protocol RUI command packets through the TCP connection. The combined control protocol command packet contains a command corresponding to a CEC command.

In some embodiments, a receiving device reads a combined control protocol RUI command packet from the connection, verifies the validity and contents of the RUI command packet, extracts the command, and deals with it as if it were a CEC or RCP command. In some embodiments, there is no response defined over the combined control protocol from the CEC message. In some embodiments, the receiving device continues reading combined control protocol commands from the connection until there is a goodbye command or the connection closes.

FIGS. 6, 7, and 8 illustrate codes used in an embodiment of an apparatus or system. In some embodiments, FIGS. 6, 7, and 8 provide a list of CEC codes that may be used in a combined command protocol, together with corresponding key codes.

A device such as a CEC capable device has no concept of a command stream connection. In some embodiments, when a combined command protocol device sending a command closes the TCP connection there is no indication given to the CEC device. In some embodiments, in case of any errors, incomplete messages, unexpectedly closed control connection, or unacknowledged CEC message there is no attempt to retransmit. In some embodiments, device operation assumes that a user will detect a response from the message through other means, such as, in one example, a video stream playing in response to a command for the playing of such video stream, and will retry if no response is seen in a reasonable time. It may be assumed that users of consumer electronic devices have commonly experienced IR remote commands not getting through to the intended device, and thus the dropping of combined command protocol commands may be expected to cause the same user response.

FIG. 9 is an illustration of certain command packets utilized in an embodiment of a combined control protocol. In this illustration, the command packets include a key press command packet, a key release command packet 910, and a goodbye command packet 915.

Figure 10:
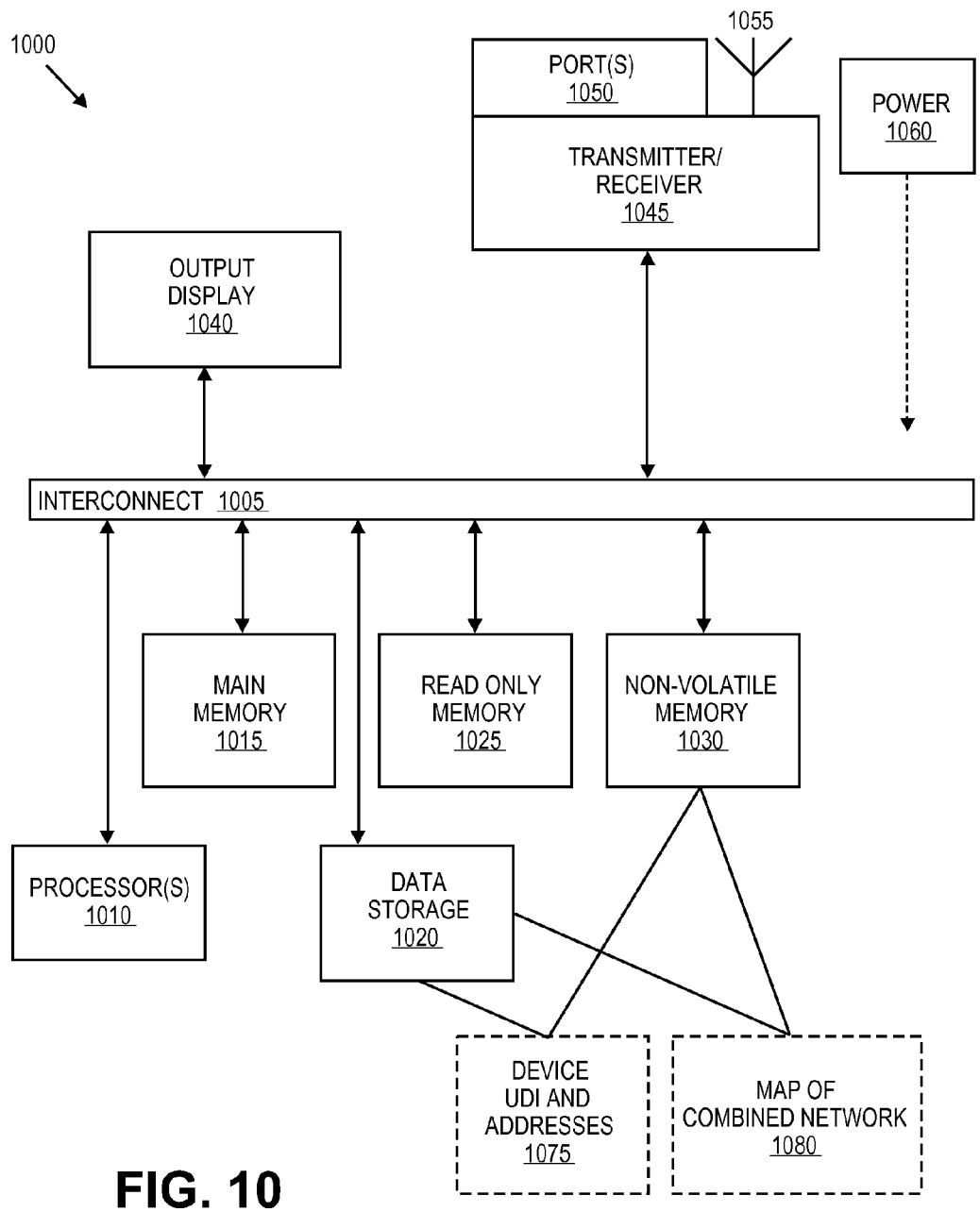
FIG. 10 illustrates an embodiment of an electronic device.

FIG. 10 illustrates an embodiment of an electronic device. In this illustration, certain standard and well-known components that are not germane to the present description are not shown. In some embodiments, the device 1000 is a device operating in a command and control network, such as a device 120-150 in network 100 illustrated in FIG. 1.

Under some embodiments, the device 1000 comprises an interconnect or crossbar 1005 or other communication means for transmission of data. The data may include various types of data, including, for example, audio-visual data and related control data. The device 1000 may include a processing means such as one or more processors 1010 coupled with the interconnect 1005 for processing information. The processors 1010 may comprise one or more physical processors and one or more logical processors. Further, each of the processors 1010 may include multiple processor cores. The interconnect 1005 is illustrated as a single interconnect for simplicity, but may represent multiple different interconnects or buses and the component connections to such interconnects may vary. The interconnect 1005 shown in FIG. 10 is an abstraction that represents any one or more separate physical buses, point-to-point connections, or both connected by appropriate bridges, adapters, or controllers. The interconnect 1005 may include, for example, a system bus, a PCI or PCIe bus, a Hyper-Transport or industry standard architecture (ISA) bus, a small computer system interface (SCSI) bus, a IIC (I2C) bus, or an Institute of Electrical and Electronics Engineers (IEEE) standard 1394 bus, sometimes referred to as "Firewire". ("Standard for a High Performance Serial Bus" 1394-1995, IEEE, published Aug. 30, 1996, and supplements)

In some embodiments, the device 1000 further comprises a random access memory (RAM) or other dynamic storage device as a main memory 1015 for storing information and instructions to be executed by the processors 1010. Main memory 1015 also may be used for storing data for data streams or sub-streams. RAM memory includes dynamic random access memory (DRAM), which requires refreshing of memory contents, and static random access memory (SRAM), which does not require refreshing contents, but at increased cost. DRAM memory may include synchronous dynamic random access memory (SDRAM), which includes a clock signal to control signals, and extended data-out dynamic random access memory (EDO DRAM). In some embodiments, memory of the system may certain registers or other special purpose memory. The device 1000 also may comprise a read only memory (ROM) 1025 or other static storage device for storing static information and instructions for the processors 1010. The device 1000 may include one or more non-volatile memory elements 1030 for the storage of certain elements.

Data storage 1020 may also be coupled to the interconnect 1005 of the device 1000 for storing information and instructions. The data storage 1020 may include a magnetic disk or other memory device. Such elements may be combined together or may be separate components, and utilize parts of other elements of the device 1000.

The device 1000 may also be coupled via the interconnect 1005 to an output display or presentation device 1040. In some embodiments, the display 1040 may include a liquid crystal display (LCD or any other display technology, for displaying information or content to an end user. In some environments, the display 1040 may include a touch-screen that is also utilized as at least a part of an input device. In some environments, the display 1040 may be or may include an audio device, such as a speaker for providing audio information, including the audio portion of a television program.

One or more transmitters or receivers 1045 may also be coupled to the interconnect 1005. In some embodiments, the device 1000 may include one or more ports 1050 for the reception or transmission of data. The device 1000 may further include one or more antennas 1055 for the reception of data via radio signals, such as a Wi-Fi network. In some embodiments, the device 1000 may utilize the connection for proxy communications under a combined control protocol.

The device 1000 may also comprise a power device or system 1060, which may comprise a power supply, a battery, a solar cell, a fuel cell, or other system or device for providing or generating power. The power provided by the power device or system 1060 may be distributed as required to elements of the device 1000.

Figure 11:
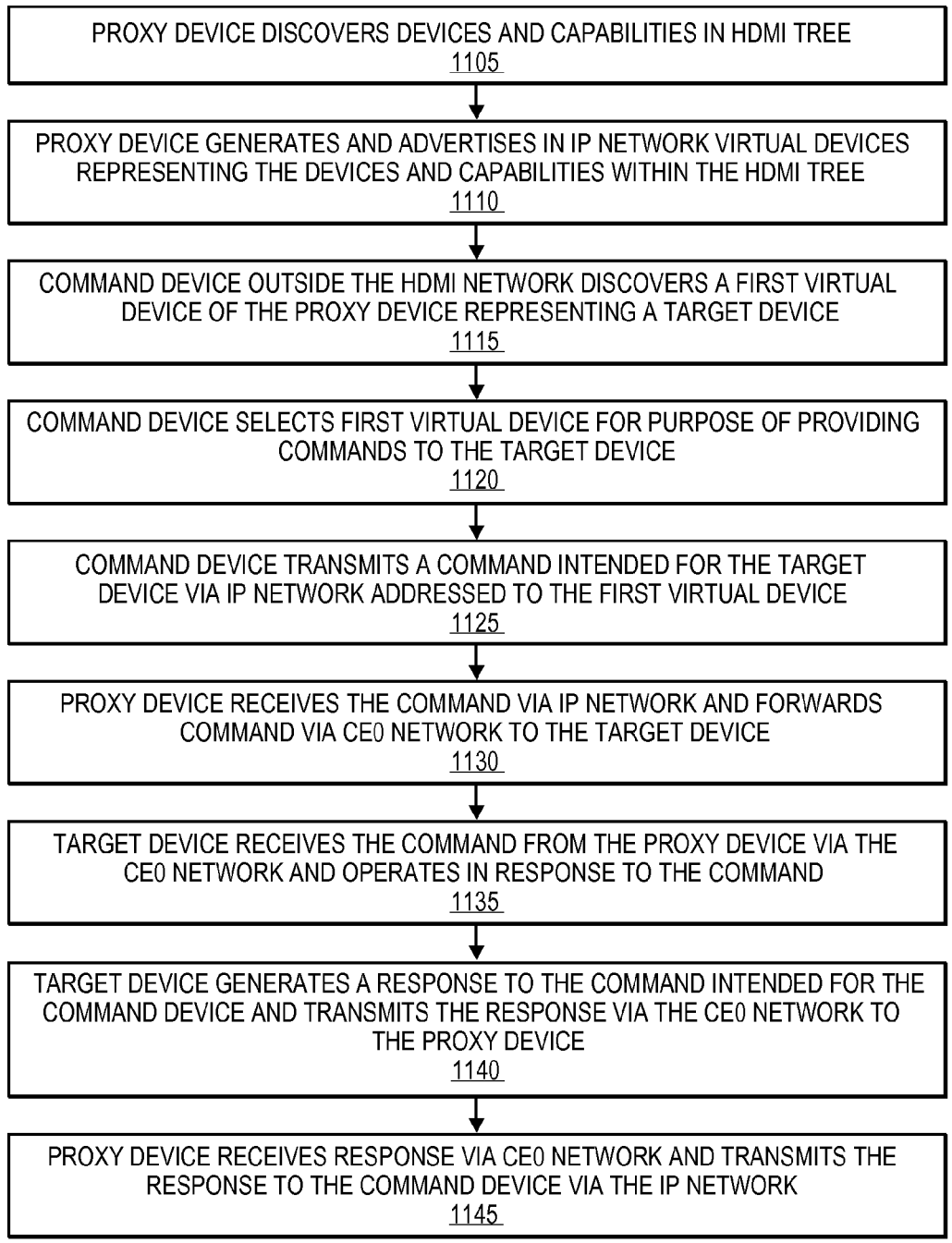
FIG. 11 is an illustration of a proxy process for devices in command and control networks.

FIG. 11 is an illustration of a proxy process for devices in command and control networks. In some embodiments, a proxy device in an HDMI (or MHL) tree, the device being a device having proxy capabilities under a combined control protocol, operates to discover devices and device capabilities within the HDMI tree 1105. In some embodiments, the proxy device generates advertises on an IP network (such as a Wi-Fi network for a house or other environment) virtual devices that represent the devices and capabilities within the HDMI tree 1110.

In some embodiments, a command device outside the HDMI tree discovers a first virtual device of the virtual devices generated by the proxy device, the first virtual device representing a target device 1115. In some embodiments, the command device selects the first virtual device for the purpose of providing commands to the target device 1120. In some embodiments, the command device transmits a command intended to the target device via the IP network addressed to the first virtual device 1125. In some embodiments, the proxy device receives the command via the IP network and forwards the command to the target device via the CEC network 1130, where the target device receives the command from the proxy device via the CEC network and operates in response to the command 1135.

In some embodiments, the target device may further generate a response to the command intended for the command device and transmit the response via the CEC network to the proxy device 1140. In some embodiments, the proxy device receives the response via the CEC network and transmits the response to the command device via the IP network 1145.

In the description above, for the purposes of explanation, numerous specific details are set forth in order to provide a thorough understanding of the present invention. It will be apparent, however, to one skilled in the art that the present invention may be practiced without some of these specific details. In other instances, well-known structures and devices are shown in block diagram form. There may be intermediate structure between illustrated components. The components described or illustrated herein may have additional inputs or outputs that are not illustrated or described. The illustrated elements or components may also be arranged in different arrangements or orders, including the reordering of any fields or the modification of field sizes.

The present invention may include various processes. The processes of the present invention may be performed by hardware components or may be embodied in computer-readable instructions, which may be used to cause a general purpose or special purpose processor or logic circuits programmed with the instructions to perform the processes. Alternatively, the processes may be performed by a combination of hardware and software.

Portions of the present invention may be provided as a computer program product, which may include a non-transitory computer-readable storage medium having stored thereon computer program instructions, which may be used to program a computer (or other electronic devices) to perform a process according to the present invention. The computer-readable storage medium may include, but is not limited to, floppy diskettes, optical disks, CD-ROMs (compact disk read-only memory), and magneto-optical disks, ROMs (read-only memory), RAMs (random access memory), EPROMs (erasable programmable read-only memory), EEPROMs (electrically-erasable programmable read-only memory), magnet or optical cards, flash memory, or other type of media/computer-readable medium suitable for storing electronic instructions. Moreover, the present invention may also be downloaded as a computer program product, wherein the program may be transferred from a remote computer to a requesting computer.

Many of the methods are described in their most basic form, but processes may be added to or deleted from any of the methods and information may be added or subtracted from any of the described messages without departing from the basic scope of the present invention. It will be apparent to those skilled in the art that many further modifications and adaptations may be made. The particular embodiments are not provided to limit the invention but to illustrate it.

If it is said that an element "A" is coupled to or with element "B," element A may be directly coupled to element B or be indirectly coupled through, for example, element C. When the specification states that a component, feature, structure, process, or characteristic A "causes" a component, feature, structure, process, or characteristic B, it means that "A" is at least a partial cause of "B" but that there may also be at least one other component, feature, structure, process, or characteristic that assists in causing "B." If the specification indicates that a component, feature, structure, process, or characteristic "may", "might", or "could" be included, that particular component, feature, structure, process, or characteristic is not required to be included. If the specification refers to "a" or "an" element, this does not mean there is only one of the described elements.

An embodiment is an implementation or example of the invention. Reference in the specification to "an embodiment," "one embodiment," "some embodiments," or "other embodiments" means that a particular feature, structure, or characteristic described in connection with the embodiments is included in at least some embodiments, but not necessarily all embodiments. The various appearances of "an embodiment," "one embodiment," or "some embodiments" are not necessarily all referring to the same embodiments. It should be appreciated that in the foregoing description of exemplary embodiments of the invention, various features of the invention are sometimes grouped together in a single embodiment, figure, or description thereof for the purpose of streamlining the disclosure and aiding in the understanding of one or more of the various inventive aspects.

What is claimed is:

1. A method comprising:
   discovering by a proxy device that communicates with both a first network and a second network of a combined network, one or more devices coupled to the proxy device via the first network, wherein the first network is an HDMI™ (High Definition Multimedia Interface) or MHL™ (Mobile High-Definition Link) compatible network that utilizes a device control protocol for transfer of messages between the one or more devices in the first network, and wherein the device control protocol is CEC (Consumer Electronics Control) for HDMI or RCP (Remote Control Protocol) for MHL;
   generating by the proxy device, one or more virtual device identifiers representing each of the one or more devices in the first network discovered by the proxy device;
   generating by the proxy device a capability vector for each of the one or more devices in the first network, the capability vector indicating one or more capabilities of a corresponding device including an indication of whether or not the corresponding device can be configured to operate as a proxy between the second network and the first network;
   periodically broadcasting by the proxy device on the second network, the one or more virtual device identifiers representing each of the one or more devices in the first network discovered by the proxy device and the corresponding capability vector of each of the one or more devices in the first network;
   receiving by the proxy device from a command device via the second network, a command directed to a target virtual identifier from the one or more virtual device identifiers broadcasted by the proxy device, the command device being outside the first network, the target virtual identifier corresponding to a target device coupled to the first network; and
   forwarding the command from the proxy device to the target device via the first network.

2. The method of claim 1, further comprising receiving a response from the target device at the proxy device via the first network and forwarding the response from the proxy device to the command device via the second network.

3. The method of claim 1, wherein the target device is not capable of receiving the command via the second network.

4. The method of claim 1, wherein the second network is an IP (Internet protocol) based network.

5. An apparatus comprising:
   a processor for the processing of data for the apparatus;
   a memory to store data for the apparatus;
   an interface with a first network and an interface with a second network, the first network and second network forming a combined network, wherein the first network is an HDMI™ (High Definition Multimedia Interface) or MHL™ (Mobile High-Definition Link) compatible network that utilizes a device control protocol for transfer of messages between the one or more devices in the first network, and wherein the device control protocol is CEC (Consumer Electronics Control) for HDMI or RCP (Remote Control Protocol) for MHL;
   wherein the apparatus is to:
   discover one or more devices coupled to the device via the first network;
   generate virtual device identifiers representing each of the one or more devices in the first network discovered by the proxy device;
   generate a capability vector for each of the one or more devices in the first network, the capability vector indicating one or more capabilities of a corresponding device including an indication of whether or not the corresponding device can be configured to operate as a proxy between the second network and the first network;
   periodically broadcast on the second network, the one or more virtual device identifiers representing each of the one more devices in the first network discovered by the proxy device and the corresponding capability vector of each of the one or more devices in the first network;
   receive a command from a command device via the second network, the command directed to a target virtual identifier from the one or more virtual identifiers broadcasted by the proxy device, the command device being outside the first network, the target virtual identifier corresponding to a target device coupled to the first network; and
   forward the command to the target device via the first network.

6. The apparatus of claim 5, wherein the apparatus is to receive a response from the target device via the first network and forward the response from the apparatus to the command device via the second network.

7. The apparatus of claim 5, wherein the target device is not capable of receiving the command via the second network.

8. The apparatus of claim 5, wherein the second network is an IP (Internet protocol) based network.

9. A non-transitory computer-readable storage medium, the computer-readable storage medium storing instructions that, when executed by a processor, cause the processor to perform steps including:
   discovering by a proxy device that communicates with both a first network and a second network of a combined network, one or more devices coupled to the proxy device via the first network, wherein the first network is an HDMI™ (High Definition Multimedia Interface) or MHL™ (Mobile High-Definition Link) compatible network that utilizes a device control protocol for transfer of messages between the one or more devices in the first network, and wherein the device control protocol is CEC (Consumer Electronics Control) for HDMI or RCP (Remote Control Protocol) for MHL;

generating by the proxy device, one or more virtual device identifiers representing each of the one or more devices in the first network discovered by the proxy device;

generating by the proxy device a capability vector for each of the one or more devices in the first network, the capability vector indicating one or more capabilities of a corresponding device including an indication of whether or not the corresponding device can be configured to operate as a proxy between a second network and the first network, the second network different than the first network;

periodically broadcasting by the proxy device on the second network, the one or more virtual device identifiers representing each of the one or more devices in the first network discovered by the proxy device and the corresponding capability vector for each of the one or more devices;

receiving by the proxy device from a command device via the second network, a command directed to a target virtual identifier from the one or more virtual device identifiers broadcasted by the proxy device, the command device being outside the first network, the target virtual identifier corresponding to a target device coupled to the first network; and forwarding the command from the proxy device to the target device via the first network.

10. The non-transitory computer-readable storage medium of claim 9, further storing instructions that, when executed by the processor, cause the processor to perform steps including:

receiving a response from the target device at the proxy device via the first network and forwarding the response from the proxy device to the command device via the second network.

11. The non-transitory computer-readable storage medium of claim 9, wherein the target device is not capable of receiving the command via the second network.

12. The non-transitory computer-readable storage medium of claim 9, wherein the second network is an IP (Internet protocol) based network.

* * * * *